INVENTORS
SAMUEL E. ARNETT
HARRY E. STARR
BY- R.J. Brodahl
ATTORNEY

United States Patent Office 3,018,621
Patented Jan. 30, 1962

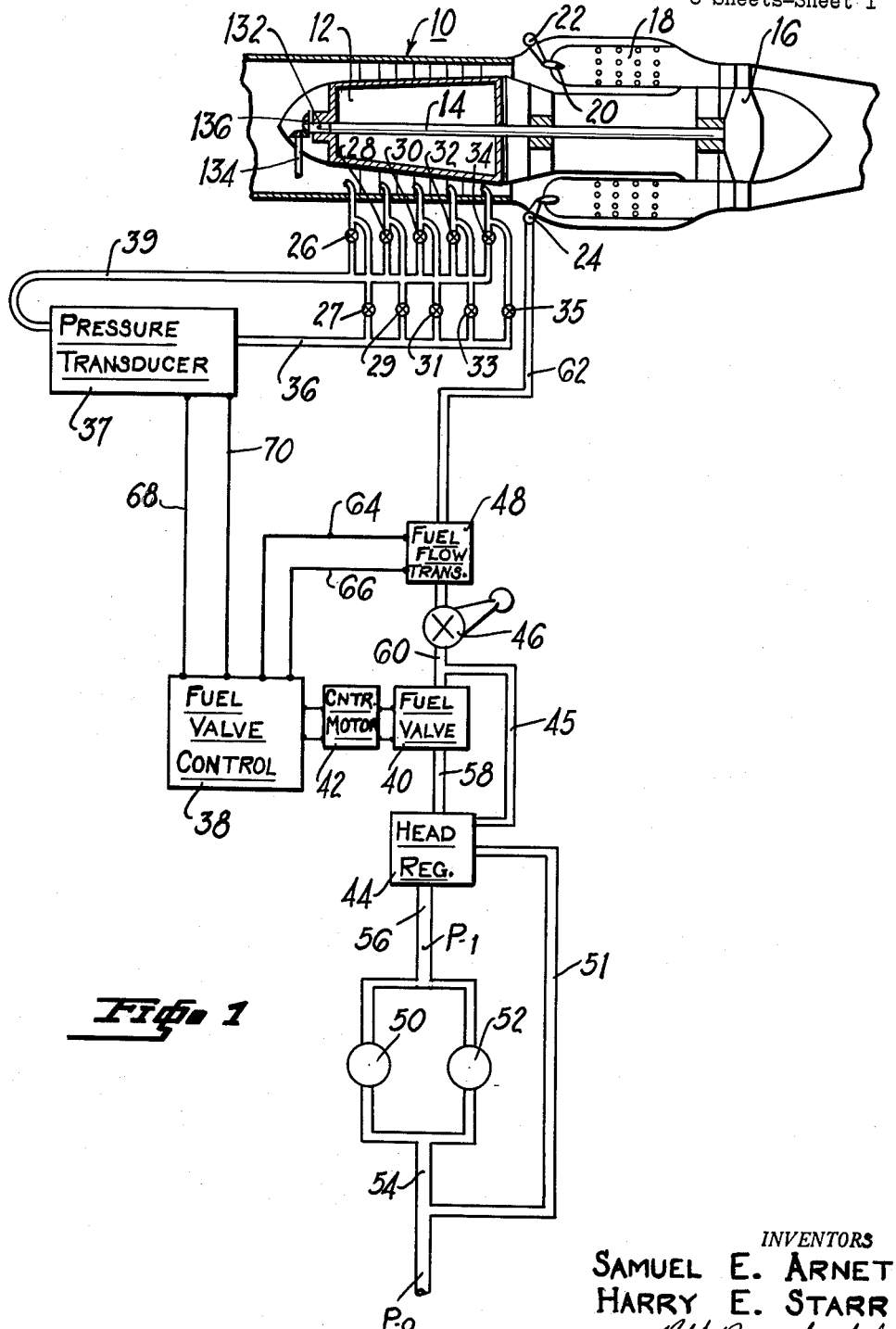

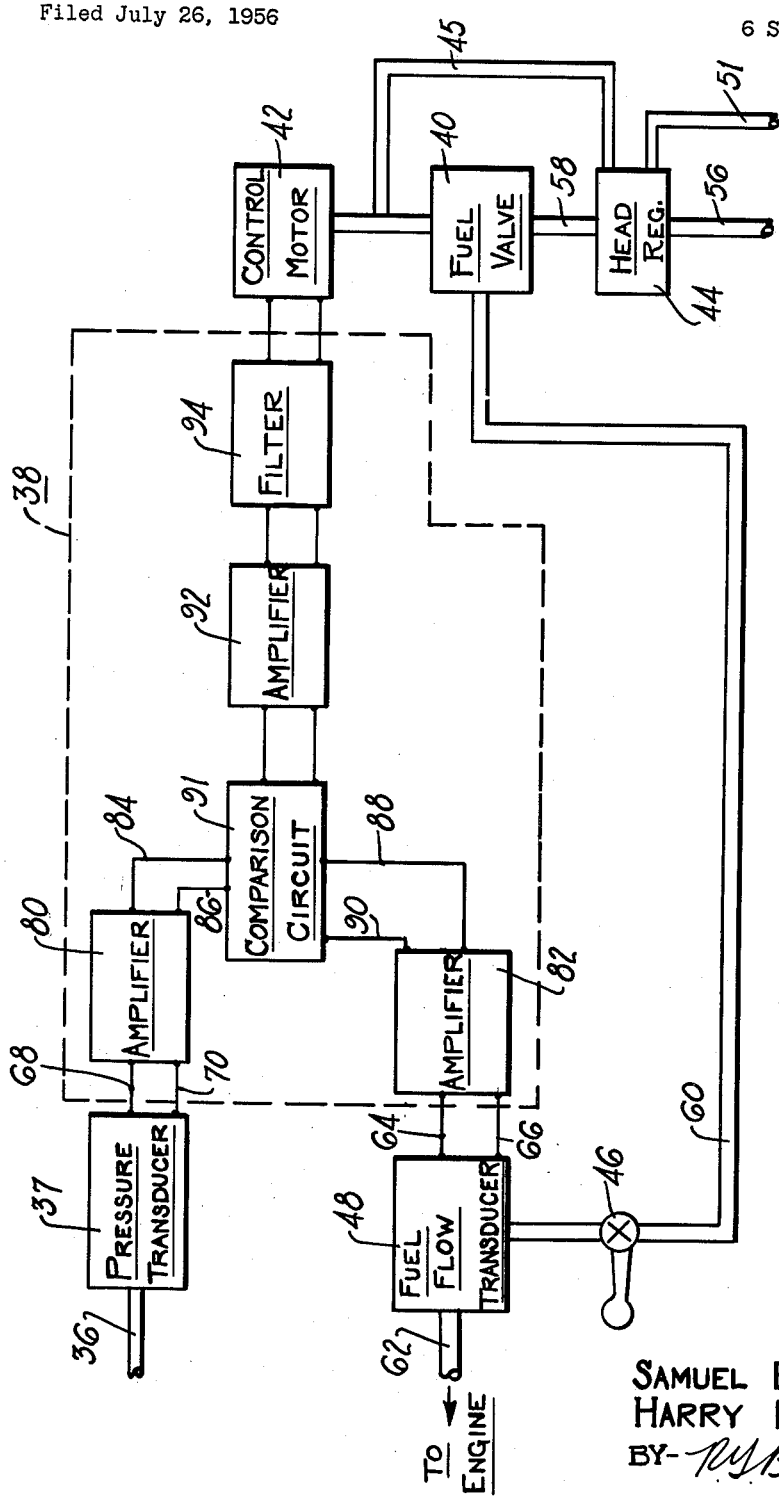

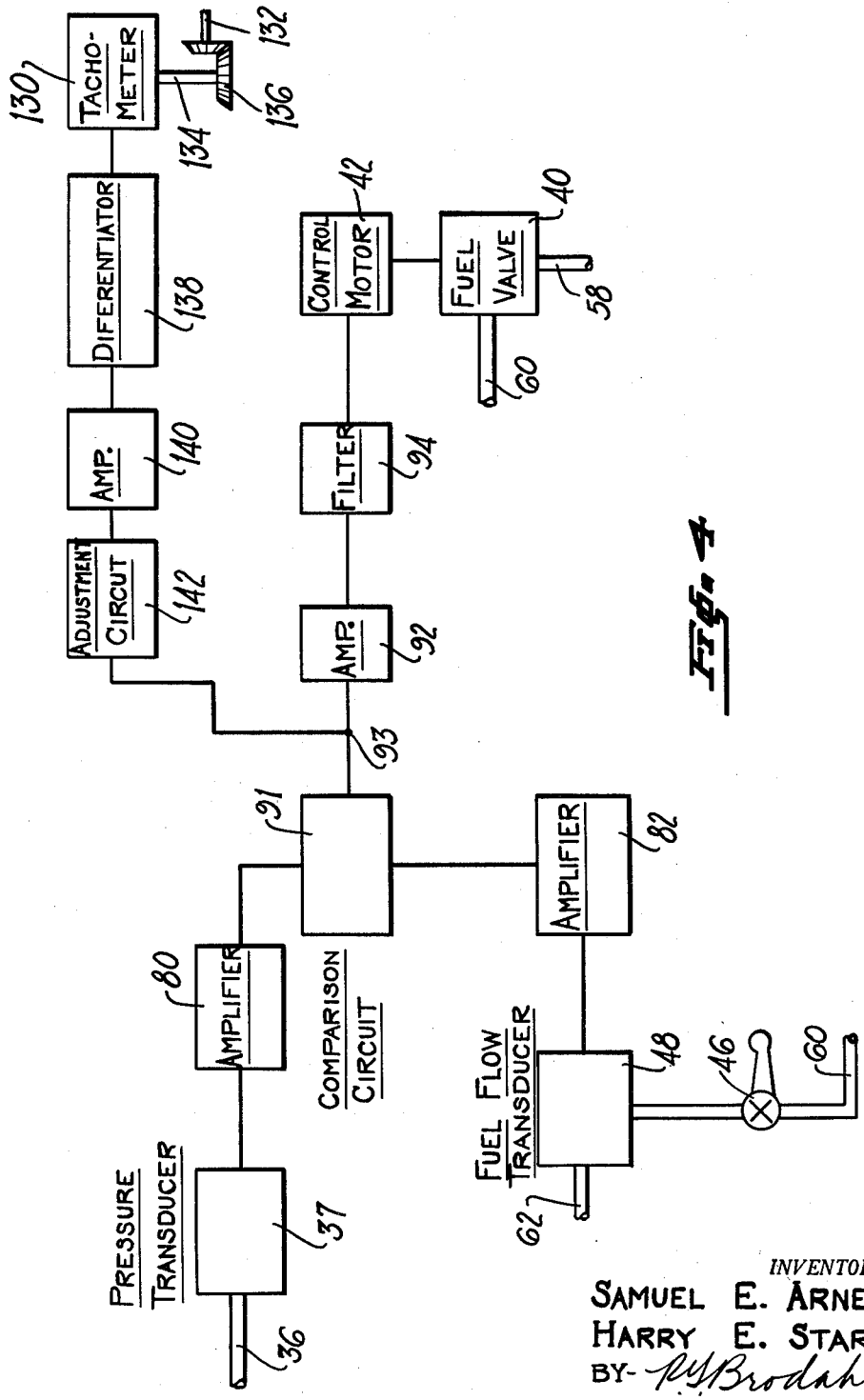

3,018,621
CONTROL APPARATUS FOR INTERNAL
COMBUSTION ENGINE
Samuel E. Arnett and Harry E. Starr, South Bend, Ind., assignors to The Bendix Corporation, a corporation of Delaware
Filed July 26, 1956, Ser. No. 600,183
6 Claims. (Cl. 60—39.28)

The present invention relates to control apparatus for an engine, and more particularly to fuel control apparatus for an internal combustion engine such as a gas turbine or the like engine.

It is an object of the present invention to provide an improved fuel control apparatus for an internal combustion engine.

It is another object of the present invention to provide an improved fuel control apparatus for an internal combustion engine including a compressor having a characteristic stall or unstable range of operation, which fuel control apparatus is operative to warn or give an indication of the approach of the compressor stall or unstable compressor operation.

It is a different object of the present invention to provide an improved fuel control apparatus for an internal combustion engine, such as a gas turbine engine including a multiple stage compressor having a characteristic range of unstable operation, said fuel control apparatus being responsive to the operative condition of said compressor to give an indication of the approach of compressor stall or the range of unstable compressor operation for controlling the operation of the engine to substantially avoid said stall or unstable compressor condition.

It is a further object of the present invention to provide an improved fuel control apparatus for an engine which fuel control apparatus is responsive to the operative condition of the compressor and is responsive to the fuel flow supply to the engine, and is operative to control the operation of said engine to substantially avoid the compressor stall or unstable operative condition.

It is an additional object of the present invention to provide an improved fuel control apparatus for an engine, which fuel control apparatus is responsive to the compressor operation and is responsive to the general engine operation for controlling the engine such that the compressor stall or unstable operating range is substantially avoided.

These and other objects and advantages of the present invention will become apparent in view of the following description taken in conjunction with the drawings wherein:

FIGURE 1 is a schematic showing of the control apparatus in accordance with the present invention;

FIGURE 2 is a schematic block diagram illustrating the fuel valve control shown in FIGURE 1;

FIGURE 4 is a schematic block diagram of a modified form of the control apparatus in accordance with the present invention;

Figure 3:
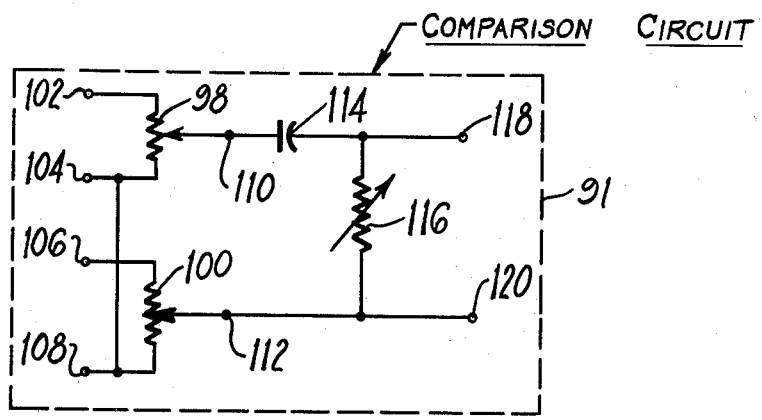
FIGURE 3 is an electrical schematic diagram of the comparison circuit shown in FIGURE 2.

Referring to FIGURE 1 there is shown a gas turbine engine 10 including a compressor unit 12 connected through a drive shaft 14 to a turbine unit 16. A plurality of combustion chambers 18 are provided with each including a fuel nozzle 20 which is connected through a fuel supply conduit 22 to a fuel manifold 24. A plurality of individual compressor stage output pressure control devices 26, 27, 28, 29, 30, 31, 32, 33, 34 and 35 are provided, and are connected through conduits 36 and 39 to a pressure transducer device 37. The latter device 37 applies a pressure control signal to a fuel valve control device 38. A fuel valve 40 is controlled by a control motor 42 which is operatively connected to the output of said fuel valve control device 38. The fuel valve 40 includes a pressure drop or head regulator 44 which senses the fuel valve pressure drop through conduits 53 and 45 and controls the pressure drop across the fuel valve 40. The output of the fuel valve 40 passes through a manual cut-off control valve 46 and through a fuel flow measuring device 48 to the fuel manifold 24.

A pair of fuel pressurizing or supply pumps 50 and 52 receive fuel from an inlet conduit 54 at inlet pressure $P_0$ and supply it to an outlet conduit 56 at pump outlet pressure $P_1$. The head regulator device 44 is operative with by-pass conduit 51 to supply a regulated pressure fuel to conduit 58 from which the fuel is supplied to the fuel valve 40. The outlet of the fuel valve 40 passes through a conduit 60 and the fuel flow measuring device 48 and through a conduit 62 to the fuel manifold 24.

The output of the fuel flow measuring device 48 is in the form of an electrical signal which varies as a function of the fuel flow to the engine and is applied through conductors 64 and 66 to the fuel valve control 38. A pressure responsive transducer device 37 may be connected to the conduit 36, which pressure responsive transducer device 37 has an output electrical pressure control signal which varies as a function of the respective compressor pressure outputs applied to the conduit 36, and which electrical output signal would be applied through conductors 68 and 70 to the fuel valve control 38 for controlling the fuel valve 40 as a function of said pressure control signal.

Referring to FIGURE 2 there is shown the fuel valve control 38 of FIGURE 1 in a schematic block diagram form. The pressure conduit 36 is shown connected to the pressure responsive transducer device 37. The fuel flow measurement device or transducer 48 is shown connected between the inlet conduit 60 through the shut-off valve 46 and the outlet conduit 62 leading to the fuel manifold 24 as shown in FIGURE 1. The electrical signal output of the pressure transducer 37 is applied through conductors 68 and 70 to a first signal amplifier device 80. The electrical signal output from the fuel flow transducer 48 is applied through conductors 64 and 66 to a second amplifier device 82. The amplified output signals from the respective amplifier devices 80 and 82 are applied to a comparison circuit through respective conductors 84, 86, 88 and 90. The comparison circuit is operative to compare these two output signals and apply a third control signal to a third amplifier device 92 then through a filter 94 until the third control signal is applied to control the operation of the control motor 42 and thereby to control the operation of the fuel valve 40.

In FIGURE 3 there is shown an electrical schematic diagram of the comparison circuit 91 shown in FIGURE 2. In FIGURE 3 there is shown a first potentiometer 98 and a second potentiometer 100 whose inputs are polarized such that when a first pressure responsive signal corresponding to the output of amplifier 80 is applied between the terminals 102 and 104 and thereby across the first potentiometer 98 and a second flow responsive signal as received from the amplifier 82, and corresponding to the fuel flow as measured by the fuel flow transducer 48, is applied between the terminals 106 and 108 and therefore across the second potentiometer 100, there results an output difference signal between the terminals 110 and 112 which is the difference of the two said input signals. This output difference signal is then applied to the differentiating capacitor-resistance circuit, including the capacitor 114 and the resistor 116, such that there appears across the terminals 118 and 120 an output third control signal which is equal to the derivative of the first pressure responsive control signal received from the amplifier 80 minus a predetermined constant times the derivative of the second fuel flow responsive control signal received from the amplifier 82, in accordance with the following formula:

$$\frac{d}{dt} \text{ first control signal} - K_1 \frac{d}{dt} \text{ second control signal} = \text{third control signal}.$$

FIGURE 4 shows a modified form of the control apparatus in accordance with the present invention, and more specifically is a modified form of the fuel valve control circuit 38 shown in FIGURE 2, and in addition includes an engine speed responsive tachometer device 130 which is operative to provide an electrical fourth speed responsive output signal which varies as a function of the speed of the engine as sensed through the shaft 132 connected to the compressor unit 12 as shown in FIGURE 1. The shaft 132 drives a second shaft 134 connected to the tachometer 130 through a set of bevel gears 136. The latter shaft and bevel gear arrangement is shown in FIGURE 1. The output of the tachometer device 130 is in the form of an electrical signal which varies as the speed of the engine 10 shown in FIGURE 1, which electrical signal is applied through a differentiating circuit 138 and an amplifier 140 and a predetermined modification constant or adjustment circuit 142 to be combined with the output of the comparison circuit 91 as shown in FIGURE 4. This so combined fifth control signal is now applied through the amplifier 92 and the filter 94 to control the operation of the control motor 42 such that the fuel valve is operated in accordance with the derivative of the first pressure responsive signal as received from the amplifier 80 minus the modified derivative of the second fuel flow responsive signal as received from the amplifier 82 and minus the modified derivative of the fourth speed responsive signal as received from the adjustment circuit 142, in accordance with the following formula:

$$\frac{d}{dt} \text{ first control signal} - K_1 \frac{d}{dt} \text{ second control signal}$$

$$- K_2 \frac{d}{dt} \text{ fourth control signal} = \text{fifth control signal}.$$

Figure 5:
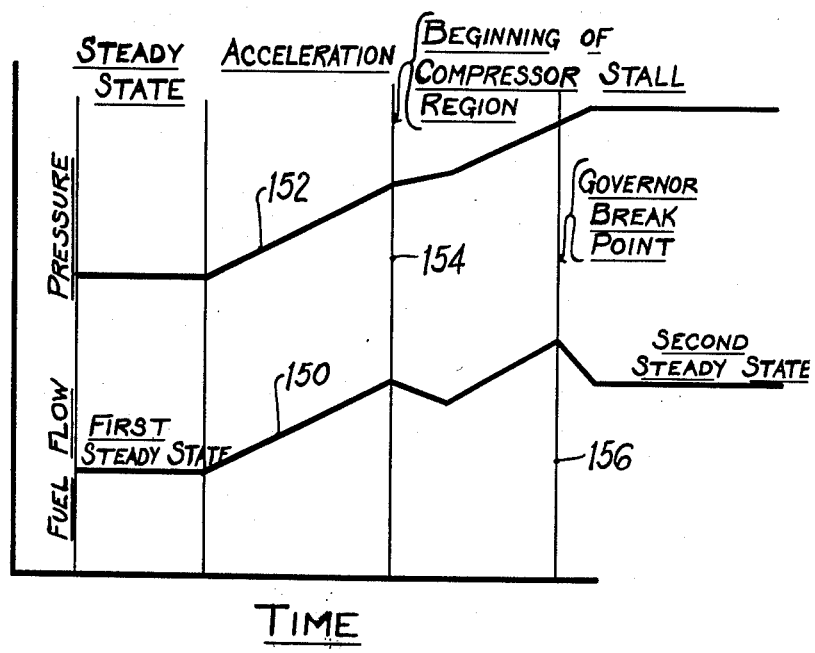
FIGURE 5 is a curve chart illustrating the operation of the control apparatus in accordance with the present invention.

Referring to FIGURE 5 there is shown a curve chart including a first curve 150 which corresponds to the fuel flow supplied to the engine during an initial steady state operating region, then an acceleration region until an unstable region, a second acceleration region and finally the governor break to a second steady state operating region. The second curve 152 corresponds to the output pressure received from a predetermined stage of the compressor 12 as shown in FIGURE 1, such as some intermediate stage like the third, fifth or seventh or the final output of the whole compressor which may be the output from the final stage. A specific multi-stage compressor tested included twelve stages, so the final output pressure of the compressor would be from the twelfth stage of such a multi-stage compressor. The output pressure control devices 26 through 35 as shown in FIGURE 1 may be used to determine which stage will be selected for control purposes in this respect. Note how the pressure curve 152 changes its slope such that the slope of the curve decreases or approaches zero just prior to the beginning of a compressor stall or unstable operating region as indicated by the vertical line 154. The fuel control apparatus in accordance with the present invention is operative to anticipate this approach of the compressor stall or unstable operating range as indicated by the line 154 and to decrease the fuel flow as shown by curve 150 prior to entering this compressor stall range. The fuel flow need be decreased only as much as required to satisfy the above formula relative to the FIGURE 2 or 4 control apparatus, and may be increased as shown by the fuel flow curve 150 when the stall region 190 shown in FIGURE 7 can be circumvented. In fact, a series of fuel increases followed by decreases may be provided by the present control apparatus in circumventing the stall region. A new steady state fuel level is reached as indicated by the portion of the fuel flow curve 150 following the governor break point shown by the vertical line 156. The unstable compressor operation near the stall region is indicated by the pressure output curve 152 just prior to the vertical line 154. The new steady state engine operation is shown by the pressure output curve 152 after the vertical line 156. The curve 152 continues to rise even after the fuel is decreased to avoid the stall region indicated by vertical line 154, since the engine is still in acceleration operation.

Figure 6:
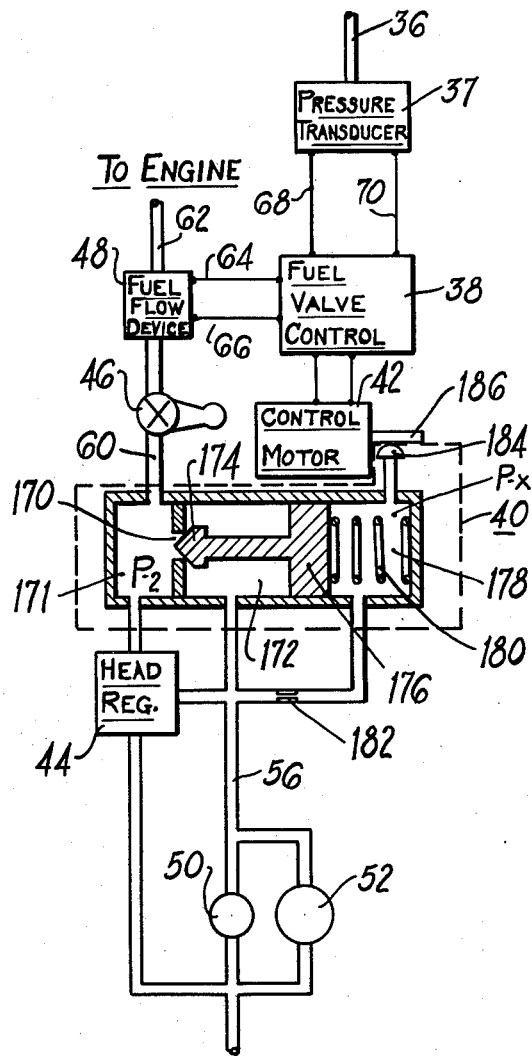
FIGURE 6 is a schematic showing of the fuel valve shown in FIGURE 1.

Referring to FIGURE 6 there is shown a schematic illustration of the fuel valve 40 as shown in FIGURE 1. The like components of the apparatus as shown in FIGURE 6 which correspond to similar components as shown in FIGURE 1 have been given similar identification numbers. The fuel valve 40 includes a control orifice 170 which is positioned between a first fuel chamber 171 and a second fuel chamber 172. The area of the orifice 170 is controlled by a movable valve member 174 connected to a pressure responsive control piston 176. The piston 176 is responsive to the pressure within the fluid chamber 172 on its smaller area side and is responsive to the fluid pressure within the chamber 178 on its larger area side. A control compression spring member 180 is provided within the fluid chamber 178. The fuel at pump output pressure $P_1$ from the fuel conduit 56 is supplied through a control orifice 182 to the fluid chamber 178 at servo pressure $P_X$ such that the control piston 176 is responsive to control fluid at pressure $P_1$ within the fluid chamber 172 operating against the combined force of the spring 180 and the servo control fluid within the chamber 178 at servo pressure $P_X$, which servo pressure $P_X$ is controlled by the position of a servo pilot or half-ball member 184. The electrical and reversible control motor 42 includes a control arm 186 which is operative to control the position of the half-ball 184 and thereby to control the position of the valve member 174 to determine the fuel flow from the fluid chamber 172 to the fluid chamber 171 and hence through the fuel flow measuring device 48 to the engine through outlet conduit 62. The flow measuring device 48 may be of the cantilever beam type described in copending application Serial No. 600,182 filed July 26, 1956 by the same inventors as the present application and assigned to the same assignee, or of the type disclosed in Patent No. 2,805,574 issued September 10, 1957 to W. Jackson Jr. et al. and entitled Wide Range Meter.

Figure 7:
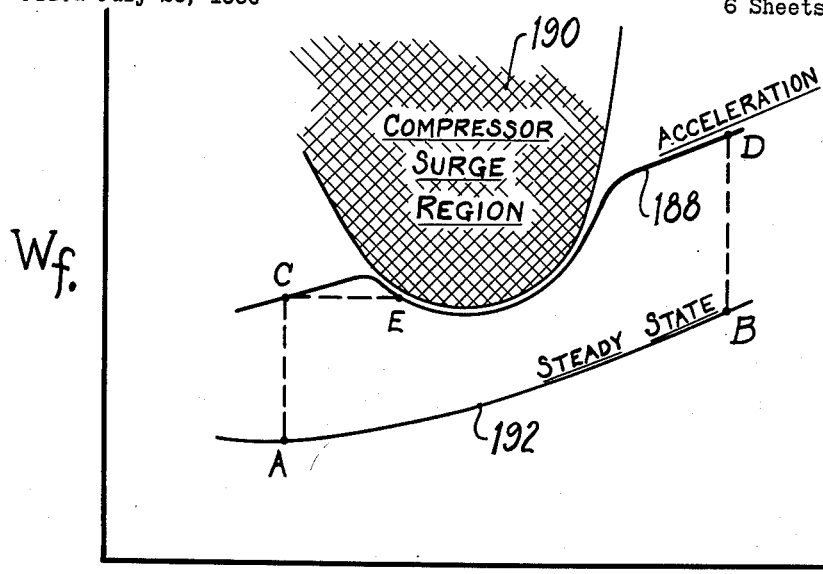
FIGURE 7 is a curve chart of fuel flow versus engine speed illustrating the steady state and acceleration operation of a gas turbine type of internal combustion engine.

Referring to FIGURE 7 there is shown the conventional acceleration curve 188 for an internal combustion engine such as a gas turbine engine having an axial flow compressor, with a compressor stall or surge area 190 as shown by the cross hatched portion of the curve chart shown in FIGURE 7. It is desirable that this compressor stall or surge area 190 be avoided, therefore when the engine is operating at a first steady state speed corresponding to point A on steady state curve 192 and it is desired to accelerate to a second speed corresponding to point B on steady state curve 192, it is customary for the fuel flow to be increased along the line A, C to the acceleration curve 188 and then for the engine speed to increase and the fuel flow to be varied such that the acceleration curve 188 is followed to the point D, whereupon the fuel flow is decreased along the line D, B back to the steady state operating curve 192 and the engine will continue to operate at the point B on the steady state curve 192.

Figure 8:
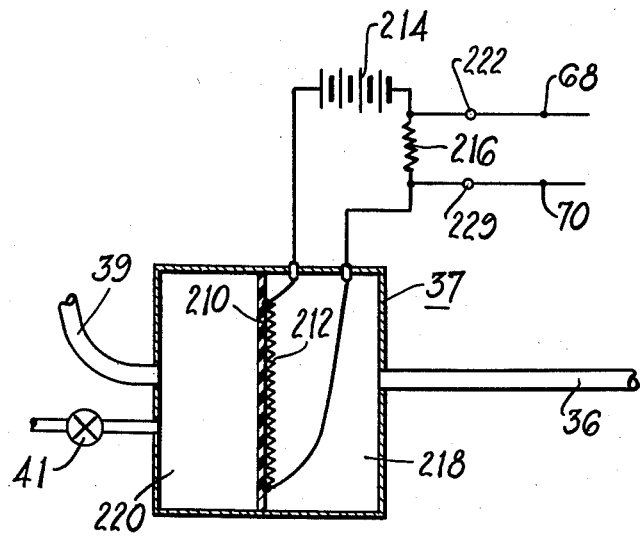
FIGURE 8 is a schematic showing of one suitable form of the pressure transducer device shown in FIGURES 1, 2, 4 and 6.

In FIGURE 8 there is shown one suitable form of the pressure transducer device 37. It includes a flexible diaphragm 210 having a stress-variable electrical resistance member 212 which is stressed in accordance with the deflection of the diaphragm 210. A voltage source 214 is connected through a second resistance member 216 and across the resistance member 212 as shown. If a first chamber 218 is connected to the conduit 36 shown in FIGURE 1, and the opposite second chamber 220 is connected to some reference pressure such as atmospheric through control valve 41 or to compressor inlet pressure through control valve 26 and conduit 39, then there will be provided between terminals 222 and 224 an electrical signal which varies as a function of the particular compressor stage pressure that is connected to the chamber 218. If instead of the former a pressure difference control signal is desired, the one compressor stage output pressure, for example the third stage, is applied to chamber 220 and the other compressor stage output pressure, for example the fifth stage, is applied to chamber 218.

It has been noted from actual engine operative tests that the change or rate of change operating parameter, such as compressor discharge pressure from the final compressor stage or the discharge pressure from some intermediate compressor stage or some predetermined difference or combination of these, may be employed as a warning that the compressor or the engine is approaching the characteristic range of stall or unstable operation. This permits the fuel flow to be controlled to allow the engine to operate at a maximum acceleration rate free from the characteristic range of compressor stall or unstable operation by noting this change or rate of change in the compressor pressure. In this respect if a derivative or rate of change of the final stage compressor output pressure or if the deriavtive or rate of change of a pressure difference between a first and a second intermediate stage of the compressor be employed as one control parameter, and compared with the derivative or rate of change of a control quantity such as fuel flow as a second control parameter, a relationship may be thereby established and determined which will allow the engine and its compressor to operate at a substantially maximum acceleration rate and still substantially avoid compressor stall or engine unstable operation. In this respect it should be noted that particularly the first few stages of a multi-stage compressor may operate in stall condition and the operation of the engine as a whole still not be objectionable such that the fuel flow to the engine as a whole should be decreased. It is the total compressor stall or stall of the whole compressor including the final stages that should be avoided.

The comparison circuit 91 as shown in FIGURE 2 is operative to make the above comparison between the pressure control signal as received from the amplifier 80 and the fuel flow control signal as received from the amplifier 82 in accordance with the following formula wherein $\dot{P}_N$ minus $K_1 \dot{W}_f$ should be greater than or equal to zero. Where $P_N$ is any single or differential compressor operating pressure and $W_f$ is the fuel flow to the engine and K is an adjustment constant. The pressure transducer 37 shown in FIGURE 2 provides an electrical control signal which is proportional to or varies as the applied pressure received from the conduit 36 as shown in FIGURE 1. The applied control pressure in conduit 36 may correspond to the output pressure from the last stage of the compressor 12 in which case the control member 35 would be opened and the pressure control members 27 through 34 would be closed, or if it is desired to control the engine operation in accordance with a pressure difference between particular intermediate stage pressures of the compressor, such as those pressures which would be responded to if pressure control members 28 and 31 were open and the control members 26, 27, 29, 30 and 32–35 were closed, or an intermediate pressure may be compared to the output stage pressure in which case the pressure control member 30 leading to conduit 39 would be open and the control member 35 leading to conduit 36 would be open and the pressure control members 26–29 and 31–34 would be closed.

The fuel flow device or transducer 48 as shown in FIGURE 2 is responsive to fuel flow to the engine through the conduit 62 such that an electrical fuel flow control signal is thereby applied to the amplifier 82. The fuel flow transducer 48 may be in the form of a cantilever type flow beam, as above mentioned, which is deflected in accordance with the fuel flow through the fuel flow transducer 48 and which includes a variable resistance member which is stressed in accordance with the deflection of the cantilever beam such that a fuel flow responsive control signal may be in this manner derived and amplified in the amplifier 82 and applied to the comparison circuit 91, which fuel flow control signal is proportional to the flow of fuel through the fuel flow transducer 48 and the conduit 62 to the engine 10. The comparison circuit 91 is operative to obtain the difference between the pressure control signal and the fuel flow control signal to thereby obtain a combined differential output signal in accordance with the above formula $\dot{P}_N - K_1 \dot{W}_f > 0$, such that a fuel control output signal is obtained and applied to the control motor 42 which is a function of the derivative of the pressure control signal minus an adjustment constant $K_1$ times the derivative of the fuel flow control signal.

A reference to the above mentioned application Serial No. 600,182 filed July 26, 1956 by the same inventors as the present application and assigned to the same assignee may be helpful in this respect.

The control motor 42 may comprise a torque motor or light fuel valve control motor of the electrical or other suitable type which controls the position of a half-ball 184 as shown in FIGURE 6 for regulating or controlling the fuel flow to the engine through the conduit 60, the fuel flow transducer 48 and the outlet conduit 62.

In accordance with the present invention when the rate of compressor output pressure increase is great, which occurs when the fluel flow is increased and engine operation is away from the stall region, the equation $\dot{P}_N$ minus $K_1$ times $\dot{W}_f$ is greater or equal to zero will be positive and hence satisfied. A reference to FIGURE 5 may be helpful in this respect. If the pressure rate of change is small or is decreasing which occurs when the slope of the pressure curve 152 approaches zero as shown in FIGURE 5, the differential value of the above equation will become negative. Since as shown in FIGURE 5 the slope of the fuel flow curve 150 is greater than the now decreasing slope of the pressure curve 152 as the compressor stall line 154 is approached, this constitutes a peaking or stall warning which means that the fuel flow to the engine should be reduced to avoid entering the compressor stall or unstable range of operation as indicated between the vertical line 154 of FIGURE 5. Similarly when the fuel flow to the engine is constant and a decrease in a predetermined compressor output pressure occurs, this is a stall warning which means that the fuel flow should be reduced to avoid the value of the above equation from becoming less than zero. A reference to the curve of FIGURE 7 will show how the latter operation could occur, if the fuel flow were increased to a value corresponding to the point C on the acceleration curve and held at this value. The engine would accelerate along the line between the point C and the point E until the point E was approached at which time the pressure control signal corresponding to the predetermined stage output compressor pressure would begin to decrease as shown by curve 152 of FIGURE 5 to indicate the approach of the compressor surge area, such that the fuel flow should be decreased in accordance with curve 150 of FIGURE 5 to avoid the engine and compressor from entering the compressor surge area 190 as shown in FIGURE 7.

In the operation of the modified apparatus shown in FIGURE 4, the compressor speed or the speed of the engine is employed to give a third speed responsive control signal. This is desirable in that the intermediate stage or the final stage output pressure of the compressor 12 is a function of compressor speed. In this case a control equation could be written as follows: $\dot{P}_N - K_1$ times $\dot{W}_f - K_2$ times $\dot{N}$ should be greater than or equal to zero. Here the pressure responsive control signal as received from the amplifier 80 is combined in the control circuit 91 with the adjusted fuel flow responsive control signal from the amplifier 82 such that there appears in the output of the comparator circuit 91 a control signal proportional to the quantity $\dot{P}_N - K_1$ times $\dot{W}_f$. At the junction point 93 of the circuit there is added to the latter control signal a speed responsive control signal and is proportional to the quantity $K_2$ times $\dot{N}$. If the difference between the output of the comparison circuit 91 and speed control signal becomes less than zero the control motor 42 is operative to decrease the supply of fuel to the engine by proper movement of the valve member 174 through the positioning of the half-ball 184 to increase the servo pressure $P_x$ within the fluid chamber 178 as shown in FIGURE 6.

Although only the preferred embodiments of the present invention have been schematically illustrated and described, it should be apparent to those skilled in the art that various changes in the structure and relative arrangement of parts may be made to suit individual requirements without departing from the scope and spirit of the present invention.

We claim:
1. In fuel control apparatus for a combustion engine including a compressor: the combination of a fuel conduit for supplying fuel to the engine; a fuel valve operative with said conduit for controlling the fuel flow through said conduit; means for controlling the operation of said fuel valve and thus fuel flow to the engine in accordance with the relationship $W_f = \dot{P}_N - K_1 \dot{W}_f$ wherein $W_f$ designates the total fuel supply to the engine, $\dot{P}_N$ designates the rate of change of a compressor generated pressure, $K_1$ designates a constant and $\dot{W}_f$ designates the rate of change of fuel flow to the engine $\dot{W}_f$, said last named means including first control means responsive to the fuel flow through said conduit, second control means responsive to the compressor generated pressure, and fuel valve control means operatively connected to said first and second control means for comparing and differentiating the response of said first and second control means and for producing a resultant control signal which varies as a function of the difference between the rate of change of said fuel flow through said conduit and the rate of change of said compressor generated pressure to actuate said fuel valve.

2. In fuel control apparatus for an engine including a compressor having a plurality of stages, the combination of a fuel conduit for supplying fuel to said engine under all conditions of engine operation over the operating range of the engine, a fuel valve operative with said conduit and in series flow therewith for controlling the fuel flow through said conduit, means operative with said conduit for controlling the pressure head across said fuel valve, first control means in series flow with said fuel valve and responsive to said fuel flow through said conduit and operative to produce a first control signal proportional to said fuel flow, second control means responsive to the pressure difference between the output pressure of a first of said stages and the output pressure of a second of said stages and operative to produce a second control signal proportional to said pressure difference, means connected to receive said first and second control signals including differentiating means for computing the rate of change of said first and second control signals and producing a third control signal which varies as a function of the rate of change of said first and second control signals, and fuel valve control means operatively connected to said last named means and responsive to said third control signal means for controlling said fuel valve to control the fuel supply to the engine as a function of said fuel flow rate of change and said pressure difference rate of change.

3. In fuel control apparatus for an engine including a compressor, the combination of a fuel conduit for supplying fuel to said engine, a fuel valve operative with said conduit for controlling the fuel flow through said conduit, first control means responsive to the change of fuel flow through said conduit and operative to produce a first electrical signal proportional to the change in fuel flow, second control means responsive to the change of a predetermined operative condition of said compressor and operative to produce a second electrical signal proportional to the change in the predetermined operating condition of the compressor, and fuel valve control means including an electrical circuit connected to receive said first and second electrical signals and produce a third electrical signal which varies as a function of the difference between the derivatives of said first and second electrical signals, and means responsive to said third electrical signal operatively connected to said fuel valve for controlling the operation of said fuel valve to supply fuel to said engine as a function of said fuel flow rate of change and said rate of change in the predetermined operative condition of said compressor, said third electrical signal being indicative of compressor stall.

4. In fuel control apparatus for an engine including a compressor having a plurality of stages, the combination of a fuel conduit for supplying fuel to said engine, a fuel valve operative with said conduit for controlling the fuel flow through said conduit to the engine, first control means responsive to a change in the fuel flow through said conduit, and operative to produce a first control signal proportional to said change, second control means responsive to a rate of change in the output pressure of a predetermined one of said compressor stages and operative to produce a second control signal proportional to said change, means responsive to said first and second control signals including differentiating means for producing a third control signal which varies as a function of the rate of change of said first and second control signals, and fuel valve control means operatively connected to said last named means for controlling the operation of said fuel valve and to thereby control the fuel supply to the engine as a function of said fuel flow rate of change and said output pressure rate of change.

5. In fuel control apparatus for an engine including a compressor having a plurality of stages, the combination of a fuel conduit for supplying fuel to said engine, a fuel valve operative with said conduit for controlling the fuel flow through said conduit, first control means responsive to a change in the fuel flow through said conduit and operative to produce a first control signal proportional to said change, second control means responsive to a change in the pressure difference between the output pressure of a first of said stages and the output pressure of a second of said stages and operative to produce a second control signal proportional to said change, means connected to receive said first and second control signals including differentiating means for computing the rate of change of said first and second control signals and producing a third control signal which varies as a function of the rate of change of said first and second control signals, and fuel valve control means operatively connected to said last named means and responsive to said third control signal for controlling the operation of said fuel valve and thereby the fuel flow to the engine as a function of said fuel flow rate of change and said pressure difference rate of change.

6. In control apparatus for an engine including a compressor, the combination of a fuel conduit for supplying fuel to said engine, fuel control means operative with said fuel conduit for controlling the fuel flow through said conduit, first engine control means responsive to the fuel flow through said conduit and operatively connected to control the operation of said fuel control means, said first engine control means having a first output signal which varies as a function of the fuel flow through said conduit, second engine control means responsive to a predetermined operating condition of said compressor and being operatively connected to control the operation of said fuel control means, said second engine control means having a second output signal which varies as a function of said predetermined operating condition of said compressor, said fuel control means including a signal comparison and differentiating device operative to differentiate said first and second output signals and produce a signal representative of the algebraic sum thereof for controlling the operation of said fuel control means and thus the supply of fuel to the engine as a function of the rate of change of said first and second output signals, said representative signal varying in a predetermined manner to indicate compressor stall.

References Cited in the file of this patent

UNITED STATES PATENTS

| | | |
|---|---|---|
| 2,429,005 | Watson et al. | Oct. 14, 1947 |
| 2,667,743 | Lee | Feb. 2, 1954 |
| 2,670,599 | Davies et al. | Mar. 2, 1954 |
| 2,673,556 | Reggio | Mar. 30, 1954 |
| 2,714,803 | Abild | Aug. 9, 1955 |
| 2,738,644 | Alford | Mar. 20, 1956 |
| 2,776,536 | Chudyk | Jan. 8, 1957 |
| 2,846,846 | Mock | Aug. 12, 1958 |
| 2,851,855 | Gamble | Sept. 16, 1958 |

UNITED STATES PATENT OFFICE
CERTIFICATE OF CORRECTION

Patent No. 3,018,621                            January 30, 1962

Samuel E. Arnett et al.

It is hereby certified that error appears in the above numbered patent requiring correction and that the said Letters Patent should read as corrected below.

Column 8, line 49, strike out "rate of".

Signed and sealed this 31st day of July 1962.

(SEAL)
Attest:

ERNEST W. SWIDER
Attesting Officer

DAVID L. LADD
Commissioner of Patents